(No Model.) 4 Sheets—Sheet 1.
H. G. WELCH.
MACHINE FOR HOLDING CATTLE WHILE BEING DEHORNED.
No. 434,309. Patented Aug. 12, 1890.
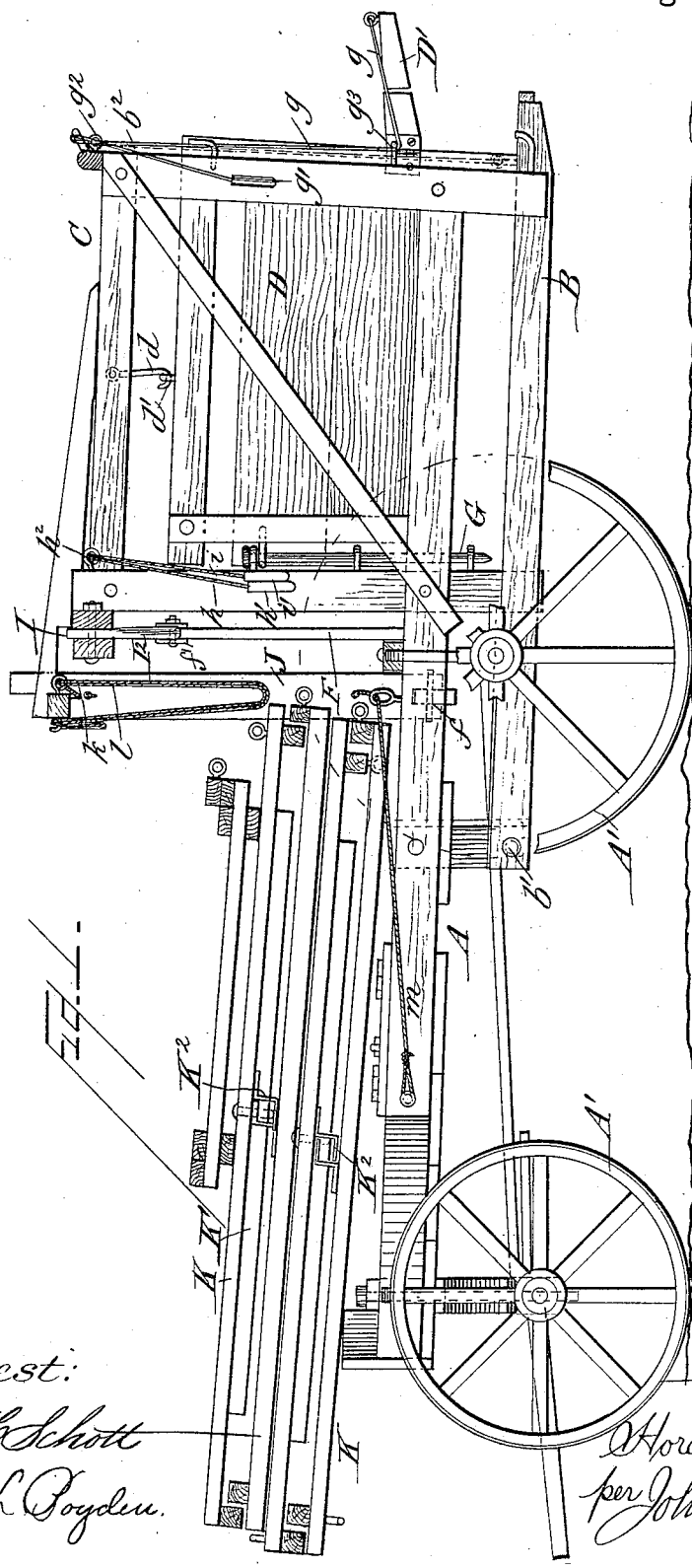

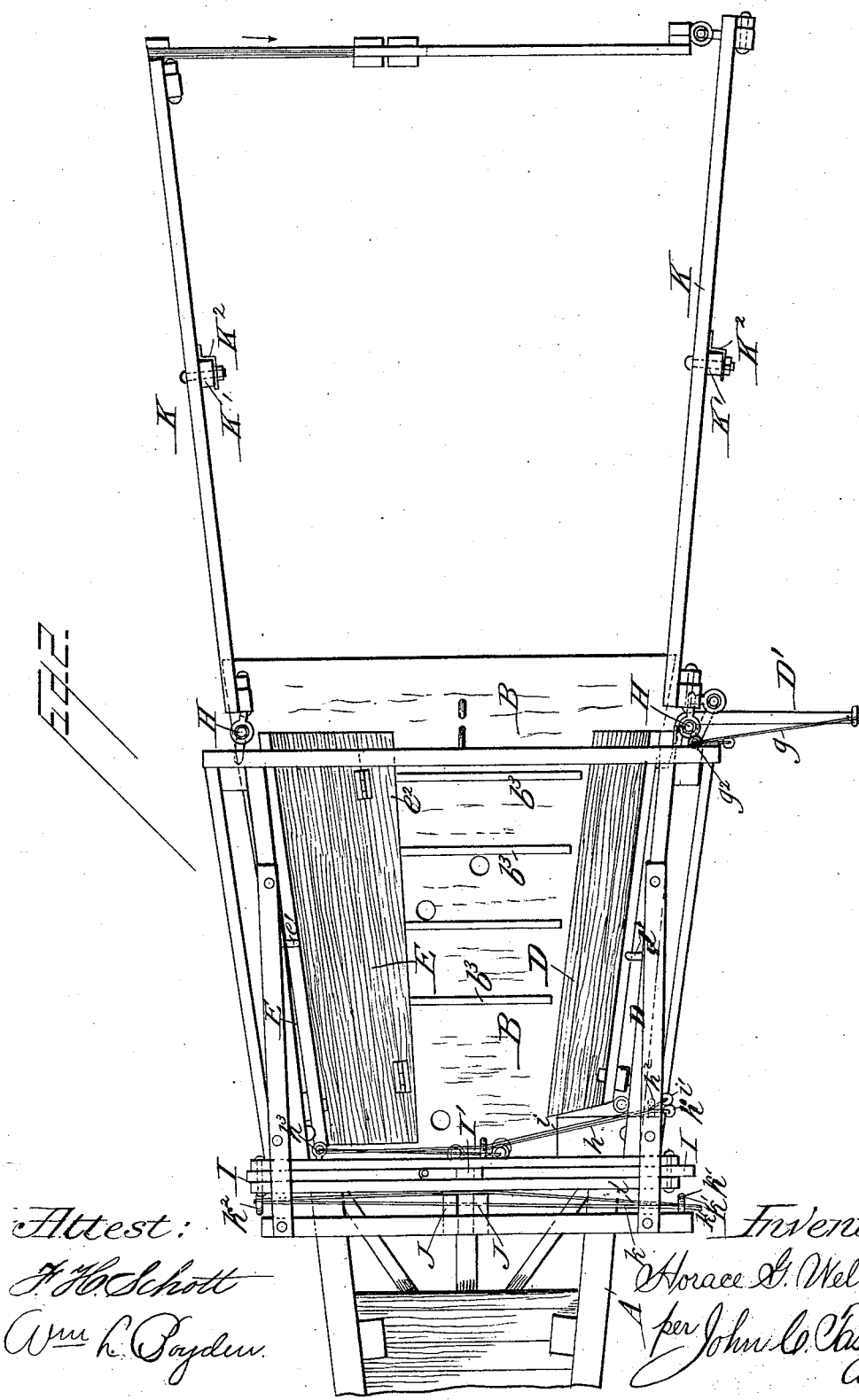

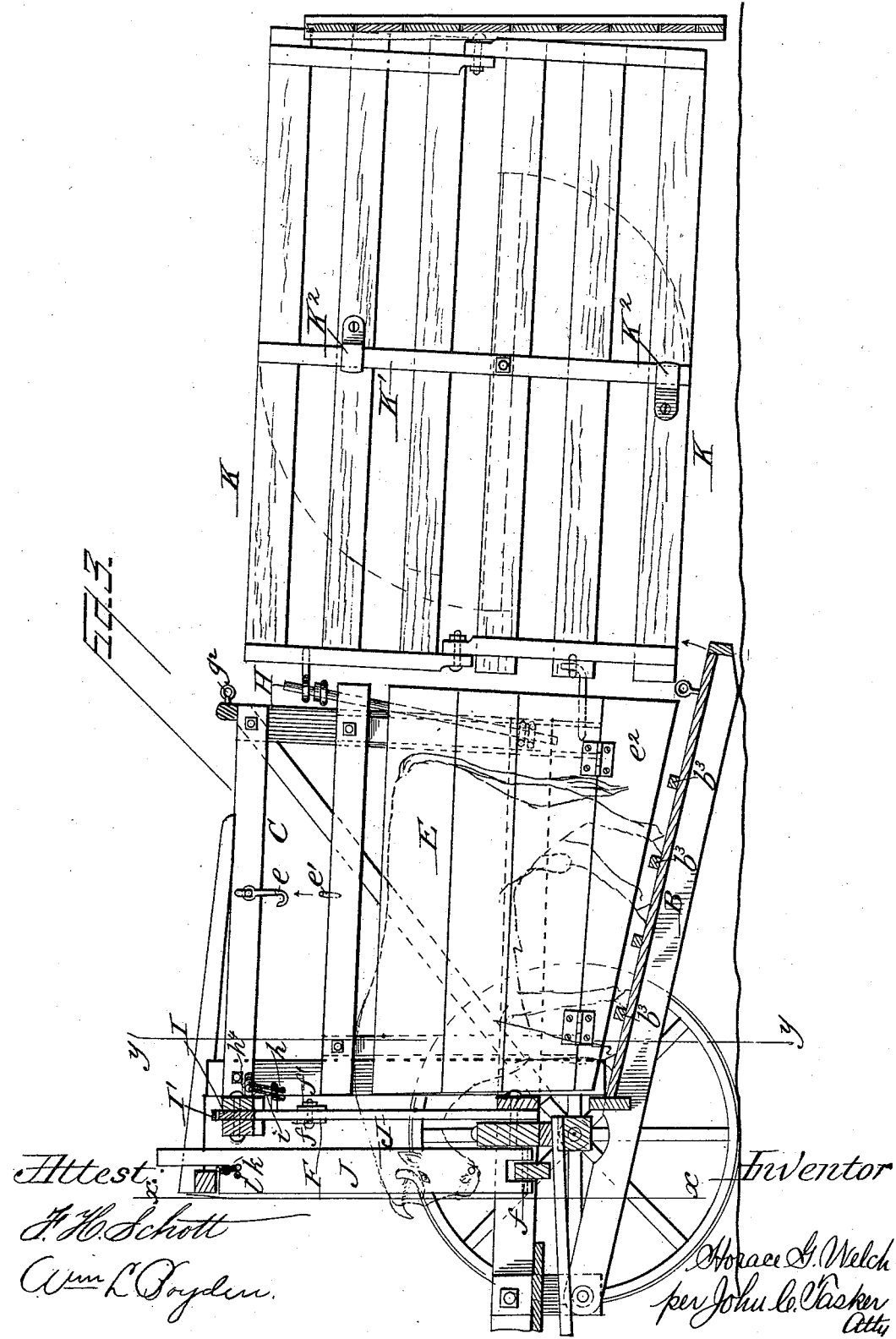

(No Model.) 4 Sheets—Sheet 4.
H. G. WELCH.
MACHINE FOR HOLDING CATTLE WHILE BEING DEHORNED.
No. 434,309. Patented Aug. 12, 1890.
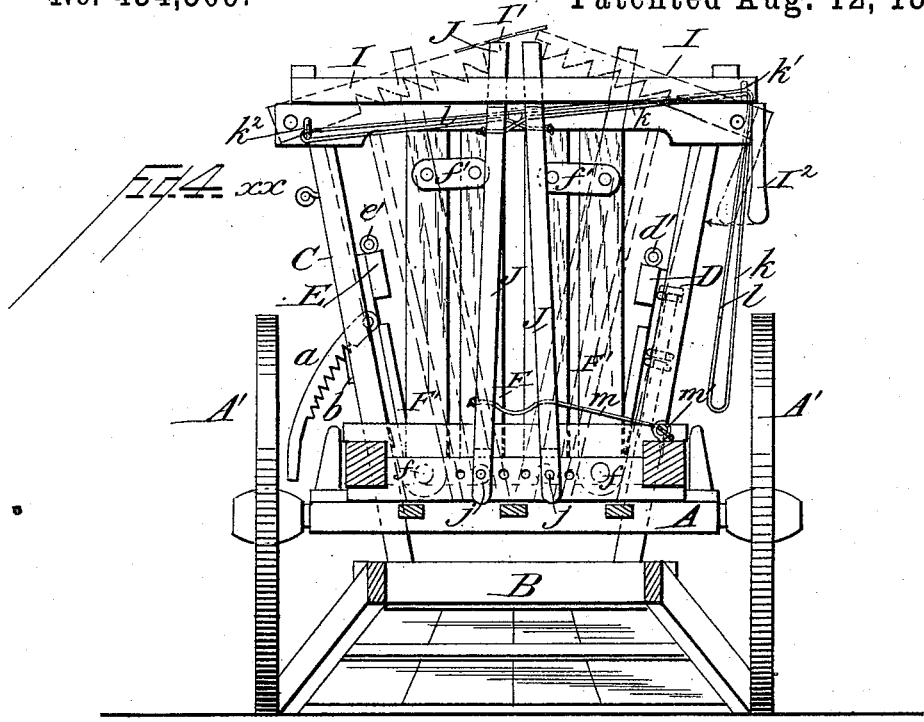
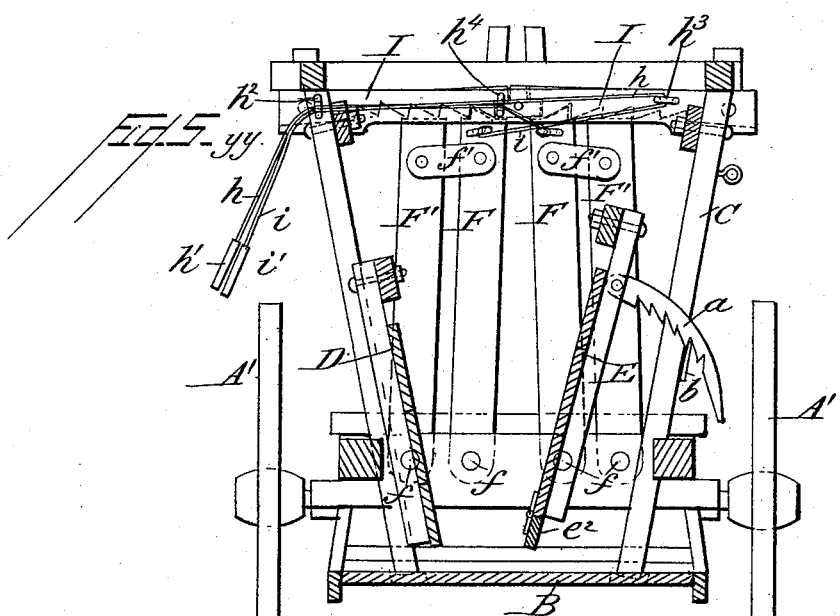
Attest:
F. H. Schott
Wm. L. Boyden.
Inventor
Horace G. Welch
per John C. Parker
Atty

UNITED STATES PATENT OFFICE.

HORACE G. WELCH, OF NEAR DOWNEY, IOWA.

MACHINE FOR HOLDING CATTLE WHILE BEING DEHORNED.

SPECIFICATION forming part of Letters Patent No. 434,309, dated August 12, 1890.

Application filed March 15, 1890. Serial No. 343,978. (No model.)

*To all whom it may concern:*

Be it known that I, HORACE G. WELCH, a citizen of the United States, residing near Downey, in the county of Cedar and State of Iowa, have invented certain new and useful Improvements in Machines for Holding Cattle while being Dehorned; and I do hereby declare the following to be a full, clear, and exact description of the invention, such as will enable others skilled in the art to which it appertains to make and use the same.

This invention relates to an improvement in machines for holding cattle and other animals while being dehorned, the object of the invention being to provide efficient means for holding cattle and other animals so that their horns may be neatly and completely removed from the heads of the same without the injury of disfigurement of the animal, said machine being preferably mounted upon a locomotive arrangement, whereby it can be easily transported from point to point throughout the country; and the invention consists, essentially, in the construction, arrangement, and combination of parts, substantially as will be hereinafter described and claimed.

In the accompanying drawings, illustrating my invention, Figure 1 is a side elevation of my improved dehorning-machine with all its parts mounted upon its conveyance ready for transportation. Fig. 2 is a top plan view of the machine and shows the parts arranged in the position that they occupy when the machine is ready for operation, the section of the pen or corral which incloses the animal previous to being dehorned being located in proper position upon the grounds in the rear of the machine. Fig. 3 is a sectional side elevation of the same, the animal being shown in the position in which he stands when the dehorning operation is being performed. Fig. 4 is an end sectional view, on the line $x\ x$ of Fig. 3, looking from the outside of the machine. Fig. 5 is a sectional elevation, on the line $y\ y$ of Fig. 3, looking from the inside of the machine.

Similar letters of reference designate corresponding parts throughout all the different figures of the drawings.

A denotes the main frame of the carriage or other vehicle which I employ, upon which to mount the several parts of my improved machine for removing the horns from cattle, said main frame A being constructed in any desirable general form—such as that of a platform—affording sufficient room near the forward end thereof to carry thereon the several sections of the adjustable and removable pen or corral, which, when the machine is in operative position, is arranged in the rear thereof to hold the animal before he enters the machine. Said main frame, besides affording a platform to carry the sectional pen, has mounted upon its rear portion thereof a suitably-constructed frame-work C, of a general rectangular or square form, in connection with which frame-work C the mechanical devices which secure the animal and tightly hold him while being dehorned are located.

The locomotive-frame A is provided, of course, with suitable wheels A' A', arranged on axles situated beneath the frame in the usual manner. Much variation may be had in the construction and arrangement of the parts of this transporting-vehicle, it being only necessary that it should be so made that it may serve the purposes for which it is designed and enable my improved dehorning-machine to be easily carried about from place to place.

B denotes a vertically-adjustable platform. It is arranged horizontally at the rear of the carriage, the forward end of said frame B being pivoted at $b'$ beneath the carriage-platform. The platform B is thus adapted to move upon its pivot $b'$ and be adjusted up or down. Thus it can be held in the position shown in Fig. 1, where it is supported by means of a hook $b^2$, connected at the upper end of the frame C and fastening into a staple or eye on the platform, or said platform B may occupy the position shown in Fig. 3, where its rear end rests upon the ground. Said platform is preferably provided with a series of parallel transverse cleats or ribs $b^3\ b^3$. These keep the animal from slipping when he walks up the inclined surface of the platform B. When the parts of the machine are arranged for transportation, the platform will of course be held up in the position shown in Fig. 1; but when the parts are situated for practical use the platform B will be situated in the inclined position of Fig. 3, so that the animal may easily ascend it.

Within the frame or chute C, I arrange two movable or adjustable side walls D and E, said side walls being adjustable toward or away from each other, so that when the animal stands on the platform B, between these movable side walls, they may be adjusted toward him, and he may be thus held firmly between them. By referring to Figs. 2, 4, and 5 the location and arrangement of the side walls will be clearly seen.

D denotes the left-hand wall, and E the right-hand wall, as shown in Fig. 5, which is a view looking into the frame C from the rear of the machine. Both of these walls are not only adjustable toward each other, but they are movable vertically. Thus they may keep the position shown in Fig. 1, where they are supported by means of the hooks on the upper portion of the frame C, which hooks engage staples in the upper edges of the side walls.

$d$ is a hook on the frame C, which engages a staple $d'$ on the upper edge of the wall D. Similarly $e$ is a hook which engages a staple $e'$ in the upper edge of the side wall E. Thus the side walls or plates D and E may be upheld, as indicated in Fig. 1, which is the position that they occupy when the parts of the machine are arranged for transportation, or they may be permitted to drop into the position shown in Figs. 3 and 5, where they rest upon the lowered platform B, which is the position which they will of course occupy when the parts are arranged in the operative position, as indicated in Fig. 3. The right-hand wall E is preferably hinged at its rear end, said hinge (see Fig. 3) consisting of a rod H held within staples affixed to the side wall E and also to the vertical post of the frame C. In this way of course the fact is evident that the wall E is pivoted, as it were, at its rear end, so that it may swing in a horizontal plane.

Near its forward end the side part E is provided with a ratchet-latch, consisting of an arm $a$, pivoted to the wall E and adapted to engage a catch $b$ on the frame C. As the side wall E swings upon its pivotal end, the ratchet-latch engaging the catch $b$ will serve to keep it in any desired position to which it may be horizontally adjusted. The side wall D is movably held at its front end by means of a hinge similar to the hinge of the side wall E, said hinge being shown in Fig. 1, consisting of a rod G, which passes through suitable staples affixed to one of the pieces of the frame C, as well as to the front end of the side wall D. It may be here stated that these hinges for the side walls are made in this way, so that the walls may not only be fulcrumed at these points, but also may be vertically adjustable, the peculiar style of the hinge consisting, as it does, of a rod running through staples, permitting the vertical as well as the horizontal adjustment of the walls. Hinged to the rear end of the wall D is a horizontal wall D'. (See Figs. 1 and 2.)

$g$ is a rope having at one end a handle $g'$, said rope passing through a staple $g^2$ at the top of the frame C, also through a staple $g^3$ on one of the posts of the frame C a short distance above the arm D', and the end of the rope $g$ being connected to a staple fixed in the outermost end of said arm D'. Thus it will be seen that the operator, by laying hold of the handle $g'$ and pulling downward thereupon, will be able to push the arm D' in such a manner as to shift the wall D toward its companion wall E. By relaxing his hold upon the handle $g'$ the wall D will resume its former position.

The wall E is preferably provided at its lower edge with a hinged or folding section $e^2$, which, when the parts are in position for traveling, as shown in Fig. 1, may be folded up, so as to permit the parts to be compacted together better, whereas when the parts are in position for practical use said section $e^2$ may be folded downward, as shown in Fig. 2, so as to be close to the inclined platform B, the section $e^2$ having the inclined edge, which rests on said platform. It will thus be seen that the walls D and E are readily adjustable toward or away from each other, so as to decrease or increase the distance between them, and thus force the animal into a small space, where he will have no chance to move, or, on the other hand, release him and allow him to be extricated from the machine after it has done its work.

At the forward end of the frame or chute C, I arrange vertical stanchions which catch and hold the neck of the animal. (See Figs. 4 and 5.) I preferably provide these stanchions in pairs, which pairs consist of the two stanchions F and F', all of which are pivoted at their lower ends at $ff$, and the members of each pair being connected together near their upper ends by means of the links $f'f'$. Thus the pairs of stanchions may be swung upon their bottom pivot, so that they may be brought close together or removed wide apart. They are operated for the purpose of being brought close together by means of cords.

$h$ denotes one of the cords or ropes, having a handle $h'$. (See Figs. 4 and 5.) Said cord $h$ passes through a staple $h^2$ on the frame C, also through a staple $h^3$ in the other side of the frame C, and thence backward, having its end connected to one of the stanchions F.

$i$ denotes another cord, having a handle $i'$. This cord likewise runs through the staple $h^2$, and then through a staple $h^4$, through which staple $h^4$ the cord $h$ may likewise pass, if desired, the end of the cord $i$ being fastened to the other stanchion F. Thus it will be seen that the operator, by laying hold of the two handles $h'$ and $i'$, will be able to draw the stanchions close together; hence after the animal has entered the machine and stands between the adjustable side walls, which are adjusted so as to hold him tightly, the operator can then draw quickly upon the cords $h$ and $i$ and catch the neck of the animal between the stanchions, which will firmly close upon his neck and hold him securely. Above the stanchions are two horizontal ratchet-bars I I, pivoted at their outer ends at suitable points in the frame C. One of these bars has a flat metallic strip I′, which rests loosely upon the top of the other bar I. These ratchet-bars are provided with a series of indentations or teeth, which adapt them to engage the upper ends of the stanchions, and hence when the operator pulls the cords to close the stanchions together the ratchet-bars engaging their upper ends will securely lock them in the position to which they are adjusted. One of these arms has at its outer end a downwardly-projecting handle $I^2$ at right angles to the bar or arm I, which handle can be grasped and pushed in the direction of the arrow shown in Fig. 4 for the purpose of disengaging the ratchet-teeth from the upper end of the stanchion, and thus unlocking the stanchion whenever it may be desired to do so. Since the inner end of the arm provided bar rests beneath the strip I′, it will be evident that when the handle is pressed inward both ratchet-bars will be lifted simultaneously. It is found convenient oftentimes to provide the upper ends of the stanchions with projections or prongs, which will more quickly be engaged by the teeth of the ratchet-bars than would be the upper ends themselves of the stanchions. In front of the stanchions are two vertical clamps J J. (See Fig. 4 in particular.) These bars are pivoted at their lower ends at points $j\ j$. They are adapted to be brought close together or removed wide apart, the purpose of bringing them together being to grip and tightly hold the animal's head. They are manipulated by means of suitable cords. (See Fig. 4.) $k$ denotes one of these cords passing through the staple $k'$ at one side of the frame C and through the staple $k^2$ at the other side of the frame C, and thence passing backward and being connected to one of the clamping-bars J. $l$ denotes the other cord, which passes through the staple $k'$, and running onward alongside of the cord $k$ is connected to the other clamping-bar J. By drawing upon these two cords $k$ and $l$ the bars J J may be brought close together. I also find it convenient to provide another cord $m$, which passes through a staple $m'$ on the platform A, said cord $m$ being affixed to one of the clamping-bars.

In order that the animal may be better secured and more easily introduced into the machine, I prefer to employ a supplemental or auxiliary corral, pen, or other inclosure made by means of detachable and removable fence-sections, which are adapted to be transported upon the forward end of the locomotive-carriage, being mounted thereon for the purpose as shown in Fig. 1, and which also, when the machine has been stationed in any locality for work, may be removed from the carriage-platform and arranged in the position shown in Figs. 2 and 3, where the said fence-sections form an inclosure adapted to contain and hold the animal, and from which he may be easily driven into the chute or frame at the rear of the locomotive-carriage, and thus brought into the proper position for the operator to begin his work of dehorning. The parts which form this pen consist of two side gates and a rear gate. Each side gate is composed of two sections K K, pivoted together and adapted to be folded upon each other, so as to occupy but little space, or to be unfolded to form a high fence, as shown in Fig. 3. On one of the sections K is pivoted a transverse bar K′, which, when the sections K K are unfolded, is adapted to swing upon its pivot and pass under the metallic straps $K^2 K^2$ on each section, so that the transverse bar thus serves as a brace to keep the sections in the unclosed position. The ends of these sections are provided with hinges of suitable construction, whereby the side gates may be connected movably to the side posts at each end of the frame C and adjacent to the rear ends of the movable side walls, that are located within said frame, as we have seen. Besides the two side gates, which form the side walls of the removable pen or corral, there is a rear transverse gate adapted to connect the said side gates. (See Fig. 2.) This gate is preferably composed of a series of slats, together with cross-slats, half of the said series of slats being secured to two of the cross-slats and half to the other two cross-slats, so that the gate is extensible, the alternate cross-slats sliding between the others. This gate is hung by suitable hinges or pivots upon one of the side sections of the fence. Thus the pen or inclosure is formed. It is easily opened to admit the animal and as easily closed.

In using my improved machine for dehorning cattle the machine will first be located with its rear end near the gate of the yard, where the cattle are ordinarily kept, and the chute or the rear portion of the machine may be connected with said yard by means of the auxiliary side gates, which I have just described. The animal will then be driven into the inclosure, thus into the chute, and the rear gate will be closed behind him. When his head passes through the stanchions, the operator will lay hold of the proper handles to close the stanchions, so as to hold him fast. Then the operator will pull upon the other handles or cords, so as to operate the side walls against the animal, and then he will fasten the front clamping-bars, so that the animal may be prevented from moving his head. A rope is then drawn around the animal's nose, and his nose is drawn down, as shown in dotted lines in Fig. 3. The horns are then easily sawed off by the operator by the use of any convenient and suitable sawing device. After the sawing operation has been neatly performed and the animal nicely dehorned he may be released by the proper manipulation of the parts of the machine and let out of the chute.

Having thus described my invention, what I claim as new, and desire to secure by Letters Patent, is—

1. The combination of the carriage-platform, the platform pivoted thereto and forming the bottom of the chute, the chute-frame, the side walls horizontally and vertically movable, the adjustable stanchions, together with their locking devices, and the clamping-bars, together with the devices for operating them, substantially as described.

2. In a machine for dehorning cattle, the combination of the carriage-platform, the platform pivoted thereto and forming the bottom of the chute, the movable side walls hinged so as to be horizontally and vertically adjustable, and the movable stanchions with their locking devices, substantially as described.

3. In combination with the chute-frame, side walls arranged therein, the stanchions, and the platform of the carriage, the platform pivoted thereto and forming the bottom of the chute, the supplemental side fences, and the rear gate arranged to form a pen or inclosure behind the chute-frame, as set forth.

4. In a machine for dehorning cattle, the combination of the carriage, its platform, the platform pivoted thereto and forming the bottom of the chute, which platform is adapted to be held in an elevated position for transportation, and to rest at its rear end upon the ground when the machine is in practical operation, the chute-frame, the movable side walls, stanchions, means for adjusting said side walls and stanchions, the supplemental side fences composed of folding sections, and the extensible gate arranged between said side fences, substantially as described.

5. In a machine for dehorning cattle, the combination of the carriage having the forward platform on which to mount the detachable parts, the rear platform forming the bottom of the chute and pivoted to the forward platform, the chute-frame, the movable side walls hinged so as to be horizontally and vertically movable, the pivoted stanchion-bars having locking devices, the pivoted clamping-bars located in front of the stanchion-bars, and devices for manipulating the side walls, together with suitable devices for supporting the pivoted platform and the side walls in their upper position, substantially as described.

6. The combination of the carriage having the forward platform, the rear platform forming the bottom of the chute and pivoted to the forward platform, the movable wall D, having arm D', the movable wall E, having ratchet-latch $a$, the chute-frame C, the hook $d$ thereon adapted to engage a staple $d'$ on the wall D, and the hook $e$ thereon adapted to engage the staple $e'$ on the side wall E, substantially as described.

In testimony whereof I affix my signature in presence of two witnesses.

HORACE G. WELCH.

Witnesses:
J. E. WELT,
A. L. BERSTLER.